May 14, 1968  R. J. BROERSMA ETAL  3,383,014
SIMPLIFIED POT DISPENSER
Filed Jan. 5, 1967  2 Sheets-Sheet 1
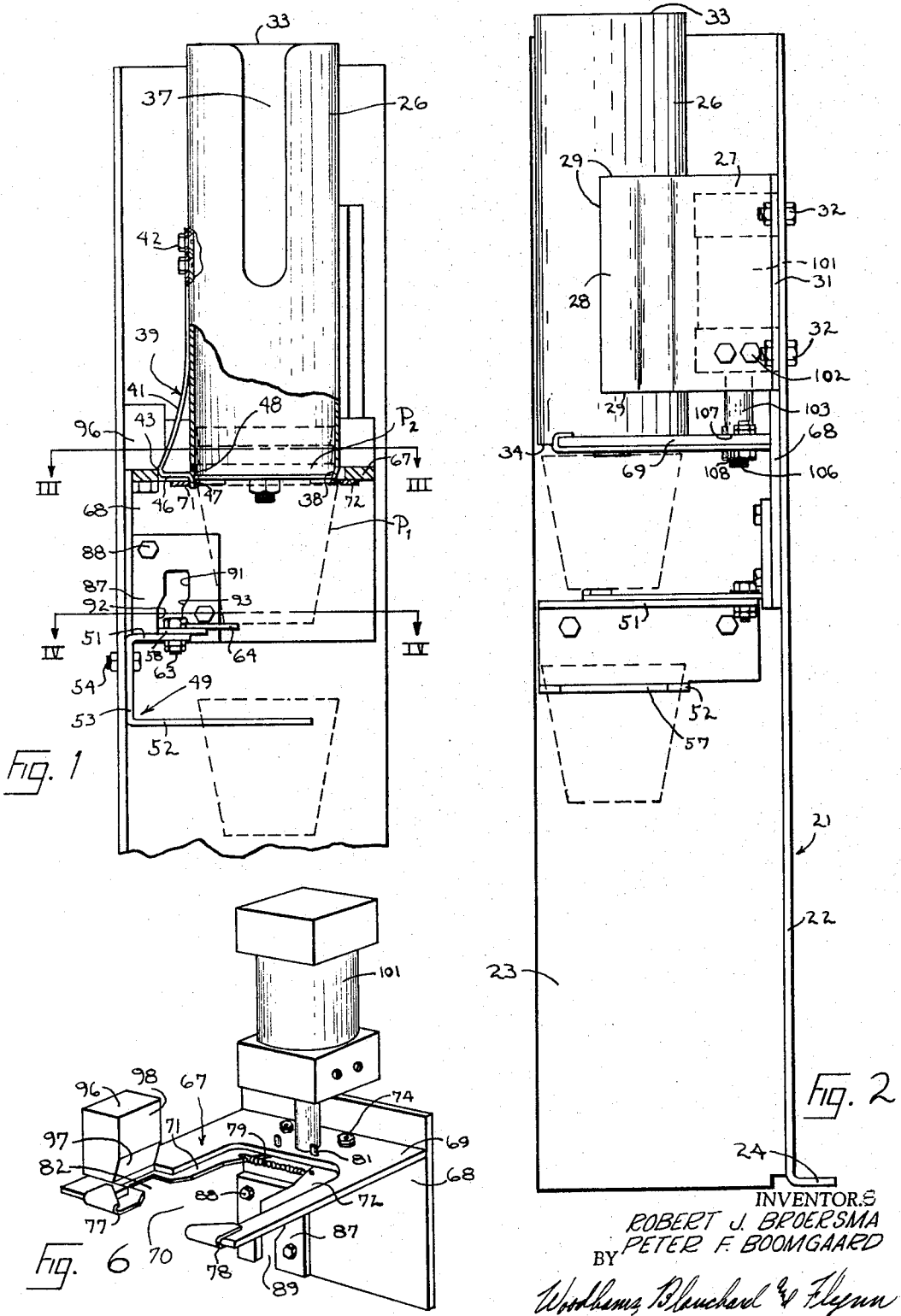
INVENTORS
ROBERT J. BROERSMA
PETER F. BOOMGAARD
BY
Woodhams, Blanchard & Flynn
ATTORNEYS May 14, 1968
R. J. BROERSMA ETAL
3,383,014
SIMPLIFIED POT DISPENSER
Filed Jan. 5, 1967
2 Sheets-Sheet 2
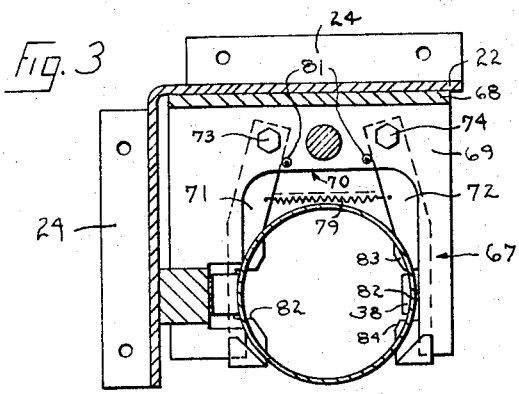
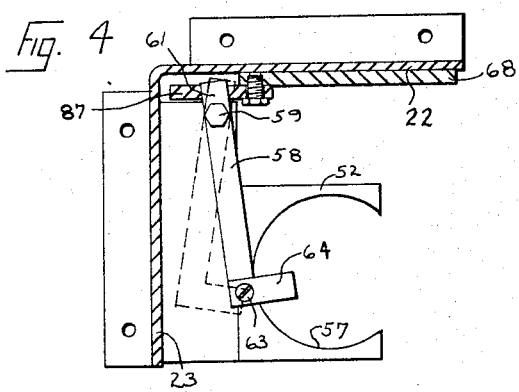
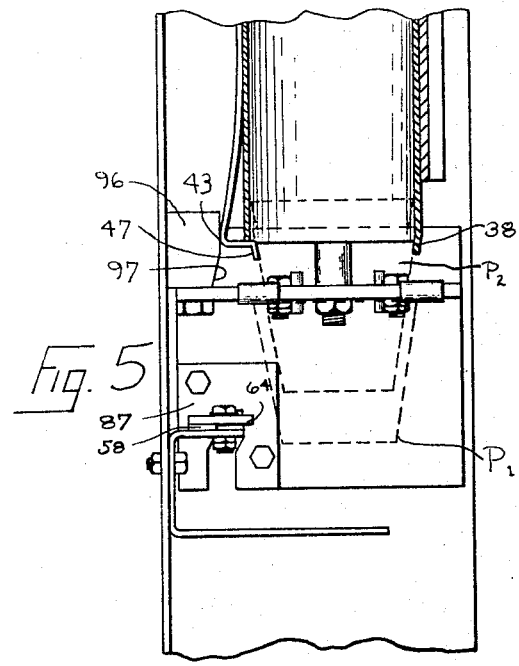
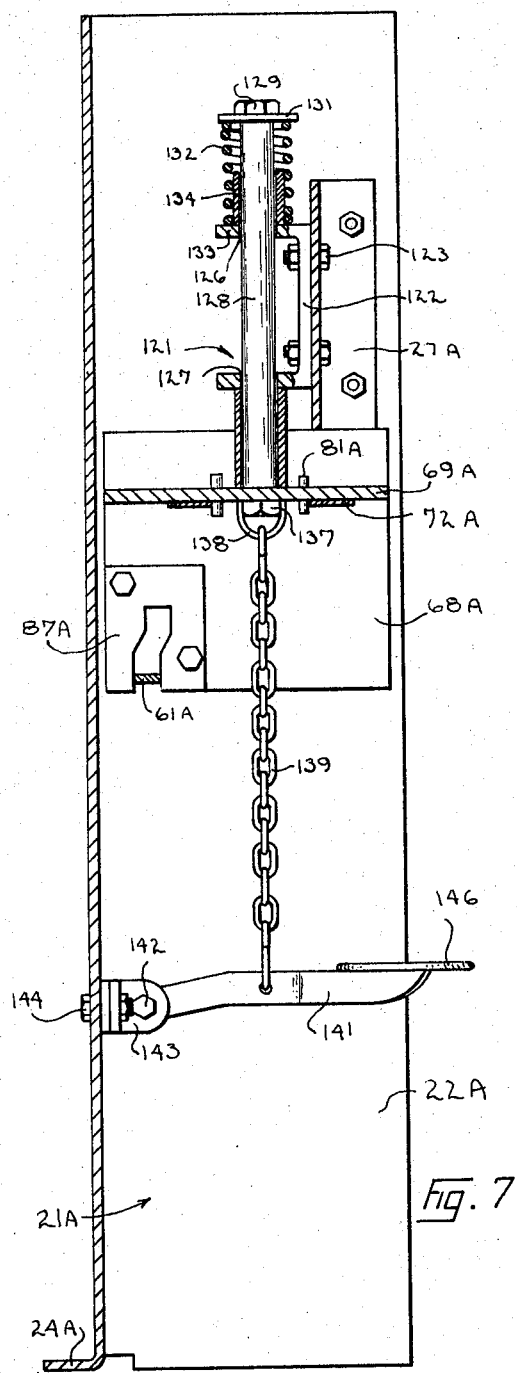
INVENTORS
ROBERT J. BROERSMA
PETER F. BOOMGAARD
BY
Woodhams, Blanchard & Flynn
ATTORNEYS

United States Patent Office 3,383,014
Patented May 14, 1968

3,383,014
SIMPLIFIED POT DISPENSER
Robert J. Broersma, Spring Lake, and Peter F. Boomgaard, Grand Haven, Mich., assignors to B & B Engineering Company, North Grand Haven, Mich., a partnership of Michigan
Filed Jan. 5, 1967, Ser. No. 607,439
18 Claims. (Cl. 221—210)

ABSTRACT OF THE DISCLOSURE

A pot dispenser having a cylindrical guide tube thereon for receiving and holding a plurality of stacked pots and also having a stripper mechanism having fingers which engage the upper edge of the lowermost pot for pushing and separating the same from the stack of pots. The dispenser further has a cam actuated spring clamp mechanism for holding the stack of pots in position while the lowermost pot is separated therefrom by the stripper mechanism. The stripper mechanism is reciprocated so as to sequentially separate and dispense the lowermost pot by means of either a pressure cylinder, mechanical drive means or a manually operated control lever.

Introduction

This invention relates to a machine for feeding pots to a pot filling machine and particularly to a type thereof adapted for the separation of pots which are stacked together, said machine being especially applicable to those pots which are made from such relatively delicate materials, as paper or compressed peat moss, that they may suffer damage as a result of manual separation thereof.

It has for several years been common practice to sell nursery products in containers made of relatively delicate, disintegrable materials such as compressed peat moss or paper. This has the obvious and well-understood advantage that such nursery products may then be placed directly into the ground without removal from such pot and same will disintegrate and thereby not inhibit the growth of the plant. However, these pots are easily broken. Thus, when they are furnished to a filling table in stacks of several thereof telescoped within each other, they are sometimes separable only with difficulty and may be damaged or completely broken in the separating process. This is particularly aggravated where said pots are being filled on a high-speed basis such as by a number of people sitting on either side of an appropriate filling table and the person assigned to separate the pots has difficulty keeping up with the persons utilizing same.

The machine disclosed in copending application Ser. No. 590,804, filed Oct. 31, 1966, has proven very successful in separating and dispensing peat pots without damaging the same. However, this machine is of a rather complex nature and is thus expensive to manufacture and is also relatively large and of substantial weight. Furthermore, the mechanism for operating this machine is relatively complex and is thus not readily adaptable for manual operation. Therefore, this machine, while highly successful for a nursery which does a great deal of potting and thus has a continual need for a large number of pots, it is not as desirable for a nursery which operates on a relatively small scale since such a nursery can neither afford the initial investment for the more expensive machine nor do they have the automatic equipment available for operating such machine. On the other hand, small nurseries have a need for a machine which is capable of separating a small number of selected pots, yet permitting the separation to be accomplished by manual operation thereof. Therefore, there is a substantial market for such a machine but one which is of lesser initial expense and readily adaptable for either power or manual operation. Furthermore, such a machine should be of relatively light weight so as to permit it to be readily moved about since usage thereof is generally of a cyclic nature and thus it is desirable to be able to move or store the machine when not in use.

Accordingly, the objects of the invention include:
(1) To provide a machine capable of separating stacked pots, particularly where same are formed of easily damaged material such as peat moss.
(2) To provide a machine, as aforesaid, which can receive a reasonable number, such as two or three dozen, of such stacked pots and will separate same rapidly and efficiently for successive discharge thereof to a point of use.
(3) To provide a machine, as aforesaid, which, while separating said pots rapidly and effectively, will nevertheless do so without appreciable, if any, damage to same.
(4) To provide a machine, as aforesaid, of efficient and simple construction as to be capable of economical manufacture as well as to be capable of long and effective use with a minimum of maintenance.
(5) To provide a machine, as aforesaid, which will be reliable and uniform in operation.
(6) To provide a machine, as aforesaid, which will be readily adjustable for handling pots of varying sizes, varying diameters and varying axial lengths.
(7) To provide a machine, as aforesaid, which will be readily adaptable for manual operation thereof for separating and dispensing pots.
(8) To provide a machine, as aforesaid, which will be of relatively light weight so as to be easily and simply moved about.
(9) To provide a machine, as aforesaid, which will have a minimum number of moving parts and thus have a minimum amount of maintenance required thereon, yet will efficiently and quickly separate and dispense individual pots therefrom.

Other objects and purposes of the invention will be apparent to persons acquainted with the apparatus of this general type upon reading the following specification and inspection of the accompanying drawings.

In the drawings:

FIGURE 1 is a front elevational view, partially broken away and partially in central section, of the pot dispenser according to the present invention.

FIGURE 2 is a side elevational view of the pot dispenser according to the present invention.

FIGURE 3 is a sectional view taken along the line III—III of FIGURE 1 showing the stripper mechanism with the stripper fingers pivotably mounted thereon.

FIGURE 4 is a sectional view taken along the line IV—IV of FIGURE 1 showing the swing arm.

FIGURE 5 is a front elevational view, partially broken away and partially in central section showing the stripper mechanism in its lowermost position.

FIGURE 6 is a perspective view of the stripper mechanism and its interconnection with a power cylinder.

FIGURE 7 is a side elevational view partially in central section, showing a modified form of the invention.

General description

The pot dispenser according to the present invention comprises a frame having a cylindrical guide tube thereon for receiving and holding a plurality of stacked pots and for individually dispensing the same. Also mounted on the guide tube is a spring actuated holding or clamping mechanism having opposed jaws which grip the exterior of the stack of pots for holding the same. Located directly below the clamping mechanism is a stripper mechanism having fingers which engage the upper edge of the lowermost pot for pushing or stripping the same away from the stack of pots. Located directly below the stripper mechanism is a swingable stop member upon which the stack of pots rests upon release of the pot clamping mechanism. The pot dispensing apparatus is operated by means of a slideable member upon which is pivotably mounted the stripper mechanism. The slideable member also has cam members mounted thereon for coacting with the pot clamping mechanism and the swingable stop means in the proper sequence for individual separating and dispensing the pots. When the slideable member is in its uppermost position, the pot clamping mechanism is in an opened position and the stack of pots is permitted to rest upon the swingable stop member. Further, the stripper fingers are spring-biased into engagement with the second lowermost pot whereby the stripper fingers thus lie over the upper edge of the lowermost pot. When the slideable member is moved downwardly, one of the cams mounted thereon coacts with the spring actuated clamping mechanism for closing the same whereby the jaws grip and hold the complete stack of pots except for the lowermost one. Further downward movement of the slideable member and its associated cams causes the swingable stop to be moved from underneath the stack of pots and causes the stripper fingers to engage and bear against the upper edge of the lowermost pot whereby further downward movement causes the lowermost pot to be separated from the stack whereby it can then be manually removed by an operator.

When the slideable member is then moved upwardly, the swingable stop is again cammed into position underneath the stack of pots so as to permit the pots to rest thereon, and the pot clamping jaws are then opened permitting the stack of pots to fall down onto the stop member whereby they are in a position for repetition of the previously described cycle. As the pots fall down onto the stop member, the weight of the pots causes the stripper fingers to open outwardly against the tension of a spring interconnecting the same, which spring again biases the stripper fingers inwardly so as to engage the periphery of the second lowermost pot so as to be in position for repeating the separation cycle.

The slideable member can be either automatically or manually controlled and can further be actuated by power means or by a manual actuator. In the above-described manner, by continuous up-and-down movement of the movable slide member, individual pots are continuously separated from the stack of pots contained in the machine and dispensed to a position whereby the operator of the machine can then manually remove the pot for further use.

*Detailed description*

In the following description, certain terminology will be used for convenience in reference and will be recognized for convenience only and as not limiting. For example, the terms "rightward" and "leftward" will refer to directions to the right or left as contained in the drawings in connection with which said terminology is used. The terms "upward" and "downward" will refer to directions with respect to the apparatus in its normal position and use. The terms "inward" and "outward" will refer to directions toward and away from the geometric center of the apparatus and of its related parts. Such terminology will also include derivatives of said words above mentioned as well as words of similar import.

Referring to FIGURES 1 through 4, there is shown a frame or base 21 consisting of side plates 22 and 23 which are interconnected along one edge thereof, the side plates 22 and 23 each being provided with a foot portion 24 formed at one end thereof. The foot portion 24 permits the frame 21 to either freely stand upon the floor or upon any other suitable table or base mounting structure. Further, by constructing the frame 21 with only a pair of side plate members substantially as shown in FIGURE 3, the frame can be simply and economically manufactured from conventional angle iron and thus requiring little machining or assembling thereof.

The upper portion of the frame 21 has connected thereto a tubular pot guide 26, which guide is connected to the frame by means of a guide bracket 27. The guide bracket 27 is formed with a curved extremity 28 on one edge thereof having a contour substantially equal to the peripheral contour of the tubular pot guide 26 whereby the pot guide is cradled within the curved extremity and interconnected thereto by any suitable means, such as by welding along the edges 29. In this manner, the pot guide is rigidly interconnected to the guide bracket 27, which bracket in turn has a base portion 31 which is rigidly interconnected to the frame 21 by means of bolts 32.

The upper and lower ends 33 and 34 of the tubular guide member are open, the upper end being utilized for loading the apparatus, while the lower end is utilized for dispensing pots. The upper end further has an axial slot 37 provided therein, which slot permits the operator to more easily load the pots within the tubular guide since the slot permits the operator to hold the pots without having to drop the pots down through the guide member. Furthermore, the slot permits the operator to readily observe the level of pots within the pot guide so as to know when the pot guide is about empty and requires refilling. The lower end of the pot guide 26 is formed with an integral clamp finger or jaw 38 thereon, which clamp finger is bent inwardly so as to contact the periphery of the pots contained within the guide. Furthermore, if desired, the clamp finger 38 could be separately formed of a spring material and bolted to the periphery of the pot guide. Diametrically opposite the clamp finger 38 the pot guide is provided with a cutout portion or notch 48. The notch 48 cooperates with a spring clamp finger 39 for permitting the pots to be gripped and held within the pot guide 26.

As is clearly shown in FIGURE 1, the spring clamp finger 39 comprises a curved body portion 41 which is interconnected at one end thereof to the periphery of the pot guide 26 by means of screws or bolts 42. The other end of the curved body portion has a follower portion 43 formed thereon, which portion includes a transverse extension 46 and a gripping flange or jaw 47 formed on the end thereof. The gripping flange 47 is inclined relative to the axis of the pot guide 26, the inclination being approximately equal to the taper formed on the external periphery of the pot P whereby substantial gripping engagement between the gripping flange 47 and the periphery of the pot P can be achieved. The follower portion 43 and in particular the transverse extension 46 and the gripping flange 47 are movable in a direction substantially transverse to the axis of the stack of pots, the gripping flange being movable inwardly through the notch 48 so as to grip the outer periphery of the second lowermost pot $P_2$.

The curved body portion 41 of the spring clamp finger is preferably of spring steel so as to bias the follower portion 43 in an outward disengaged position substantially as shown in FIGURE 1. However, any other suitable resilient material could be utilized for the spring clamp finger 39. Furthermore, the spring clamp finger 39 could be made of a rigid material and biased in an outward direction by means of a conventional tension or compression spring interconnected between the clamp finger 39 and the fixed frame 21.

Mounted on the lower portion of the machine is a U-shaped support bracket 49 having an upper leg 51 and a lower leg 52 interconnected by means of an intermediate plate 53 which is fixedly connected to the frame 21 by means of bolts or screws 54. The lower leg 52 is of substantially greater length than the upper leg 51 and is provided with a circular opening 57 in the end thereof (FIGURE 4), the center of said opening being substantially aligned with the axis of said tubular pot guide 26 so as to form a catch plate for said pots as they are individually separated and dispensed from the stack. The upper leg member 51 has a swing arm 58 pivotally connected thereto by means of a bolt 59, the swing arm 58 being mounted for pivotal movement in a horizontal plane relative to the machine frame. Connected to one end of the swing arm 58 is an adjustment block 64, the block 64 being connected to the upper side of the swing arm by means of a screw 63 so as to permit ready removal thereof. As shown in FIGURE 4, the swing arm 58 with the block 64 on the end thereof functions as a stop means for the stack of pots when in one position of operation, the swing arm being pivotable outwardly away from the pots to permit the pots to pass thereby. The other end of the swing arm 58 extends beyond the pivot bolt 59 so as to form an extension 61 which functions as a cam follower for a purpose to be described hereinafter.

Mounted above the swing arm is a scissor-like pot stripping mechanism 67 which functions to separate the lowermost pot $P_1$ from the stack while the remainder of the stack is clamped in position by means of the clamp jaws 38 and 39. The pot stripping mechanism is supported on a base plate assembly 68 which is slideable in a vertical direction on the side plate member 22. The base plate has a horizontal leg 69 integrally connected thereto, such as by welding, the leg having a central opening 70 therein, which opening provides the necessary clearance so as to permit the pots to pass therethrough. The horizontal leg 69 has a pair of stripper fingers 71 and 72 mounted thereon, one finger being the mirror image of the other. The fingers 71 and 72 are pivotally connected to the horizontal leg 69 by means of bolts 73 and 74, respectively, which function as pivot members for their respective stripper finger. The ends of said stripper fingers 71 and 72 remotely spaced from the pivot bolts are each turned upwardly and inwardly so as to form a channel 77 and 78 (FIGURE 6) on the end thereof, the channel receiving therein the extending edge of the horizontal leg member 69. The channels 77 and 78 thus permit the stripper fingers to be formed of relatively lightweight material while maintaining a fixed spacial relationship between the stripper fingers and the horizontal leg, the channels prevent the fingers from flexing or bending downwardly about the pivot bolts. A tension spring 79 has its ends respectively connected to the stripper fingers 71 and 72 for biasing the same inwardly toward each other, the inward movement being limited by means of a pair of stop pins 81 which are rigidly fixed to the horizontal leg 69 and which coact with the finger members for limiting the angular movement thereof.

As is shown in FIGURE 3, each of the stripper fingers is formed with a recess 82 intermediate its length, the recesses opening inwardly toward each other. Each of the recesses 82 is bounded by tapered edges 83 and 84, respectively, having an angularity which causes the edges to be substantially tangent to the cylindrical periphery of the pots being dispensed by the device. When a pot is positioned between the stripper fingers 71 and 72, the inward relative movement of the fingers by means of the tension spring 79 causes the tapered edges 83 and 84 on the respective stripper fingers to come into abutting relationship with the periphery of the pot for limiting the relative pivotal movement thereof.

A reciprocal cam plate 87 is fixedly connected to the slideable base plate assembly 68 by means of bolts 88, the cam plate 87 being provided with a groove (or slot) 89 therein having straight portions 91 and 92 interconnected by an inclined portion 93. The cam groove 89 has a width slightly greater than the width of said swing arm 58 and slideably receives therein the swing arm extension 61 for controlling the pivotal movement of said swing arm as said cam plate 87 undergoes reciprocal movement. FIGURE 1 illustrates the cam plate 87 in its uppermost position whereby the swing arm 58 and the adjustment block 64 is positioned underneath the pot guide for holding the stack of pots thereon. On the other hand, FIGURE 5 illustrates the cam plate 87 in its lowermost position, whereby the swing arm has been pivotally moved outwardly from beneath the stack of pots so as to permit the pots to pass thereby.

As is shown in FIGURE 6, the horizontal leg 69 has an upstanding cam block 96 fixedly connected thereto, the cam block having an inclined camming surface 97 and a straight camming surface 98 formed thereon. The cam block 96 cooperates with the follower portion 43 of the spring clamp finger 39 for actuating the same so as to force the gripping jaw 47 into contact with the periphery of the second lowermost pot $P_2$. As shown in FIGURE 1, the follower portion 43 is in contact with the inclined camming surface 97 whereby the follower portion is in its outermost position and is thus not in contact with the pots contained within the pot guide 26. The inclined camming surface 97 is preferably of the same inclination or taper as is the follower portion 43.

FIGURE 5 illustrates the camming block 96 in its lowermost position wherein the downward reciprocal movement of the camming block causes the follower portion 43 to ride up the inclined camming surface 97 onto the straight camming surface 98, the above movement causing the follower portion 43 and the gripping jaw 47 to be moved radially inward such that the gripping jaw comes into contact with the edge of the second lowermost pot $P_2$, which contact causes the stack of pots to be forced over into contact with the fixed clamp jaw 38. The straight camming surface 98 holds the pots between the fixed clamp jaw 38 and the movable jaw portion 47 of the spring clamp finger 39, thus preventing the pots from falling through the pot guide when the swing arm 58 is moved to its outermost position.

The reciprocable movement of the slideable base plate assembly 68 is controlled by means of a power cylinder 101 which is fixedly mounted thereabove, the power cylinder 101 being fixedly connected to the guide bracket 27 by means of screws 102. The cylinder 101 is preferably pneumatically operated, but any other pressurized fluid or suitable mechanical drive means could be utilized. The power cylinder 101 has a piston rod 103 axially extending from one end thereof, the end of the piston rod being formed with a reduced screw section 106 thereon, the interface between the piston rod and the screw section forming a shoulder 107. The horizontal leg 69 is formed with a circular opening therein of a diameter slightly greater than the diameter of the reduced screw section 106 whereby the horizontal plate 69 is received over the screw section 106 in abutting relationship with the shoulder 107, the plate being fixedly connected to the piston rod 103 by means of a nut 108 which is threadably received on the screw section 106. In this manner, the slideable base plate assembly 68 is fixedly interconnected to the piston rod of the power cylinder 101 and the reciprocal movement thereof is thus controlled by the energization of the power cylinder. As is shown in FIGURE 2, the guide bracket 27 additionally functions as a stop member by contacting the upper edge of the slideable base plate 68 when the same is in its uppermost position. However, separate stop means could be provided for controlling both the upper and lower positions of movement of the slideable base plate assembly, if desired.

*Operation*

When it is desired to operate the above-described apparatus, assuming that the power cylinder 101 and the movable base plate 68 are in their lowermost or extended position, the operator will first energize the power cylinder 101 causing the slideable base plate assembly to be moved upwardly to its uppermost position. When the base plate assembly 68 is moved upwardly, the camming block 96 is also moved upwardly and the follower portion 43 will slide off the straight camming portion 98 onto the inclined camming portion 97 until the cam block reaches the position illustrated in FIGURE 1, thus permitting the spring clamp finger 39 to return to its normal open position whereby the gripping jaw 47 is substantially removed from the interior of the pot guide 26. Since the stripper fingers 71 and 72 are pivotally mounted on the horizontal leg 69, they will also be moved upwardly as the base plate is moved upwardly. Said upward movement of the slideable base plate assembly 68 will also cause the reciprocable cam plate 87 to be moved upwardly whereby the cam groove 89 and in particular the inclined portion 93 thereof will coact with the extension 61 on the swing arm 58 so as to cause the swing arm to move inwardly into a position whereby the adjustment block 64 will be positioned directly under the tubular pot guide 26. When the slideable base plate 68 reaches its uppermost position, the stripper fingers or jaws 71 or 72 will be at an elevation slightly above the upper edge of the lowermost pot $P_1$. The operator will then place a stack of pots in the apparatus by inserting the stack into the machine through the upper opening 33 of the guide tube 26, the stack being allowed to drop through the tube until the lowermost pot $P_1$ bears against the adjustment block 64. At this time, the machine will be in condition for the separation and individual dispensing of the pots contained therein.

To commence a dispensing operation of the apparatus, the operator will energize the power cylinder 101 in the downward direction causing the slideable base plate assembly 68 to be moved downwardly. The downward movement will cause the inclined camming surface 97 on the cam block 96 to coact with the follower portion 43 on the spring clamp finger 39, thus causing the spring clamp finger to move radially inwardly such that the gripping jaw 47 will be brought into contact with the external surface of the second lowermost pot $P_2$ contained in the stack. The coaction between the inclined cam surface 98 and the follower portion 43 and the engagement between the gripping flange 47 and the pot $P_2$ will cause the stack of pots to be pushed laterally a slight amount such that the diametrically opposite periphery of the pot $P_2$ will come into bearing contact with the fixed clamp jaw 38 formed on the opposite side of the tubular pot guide 26. The follower portion 43 will then cooperate with the straight camming surface 98 for maintaining the pot $P_2$ in clamped engagement between the clamp jaws 38 and 47. However, the lowermost pot $P_1$ will not be contacted or held by the clamping jaws.

While the above clamping action is taking place, the tapered edges 83 and 84 formed on the stripper fingers 71 and 72 will be maintained in close proximity with the external periphery of the second lowermost pot $P_2$ by means of the tension spring 79. Continued downward movement of the slideable base plate assembly 68 will cause the inclined portion 93 of the reciprocable cam plate 87 to contact the edges of the extension 61 formed on the swing arm 58 causing the swing arm to pivot outwardly from beneath the tubular pot guide 26, the stack of pots then being held solely by the clamp jaws 38 and 47. Continued downward movement of the slideable base plate assembly 68 will cause the bottom surface of the stripper fingers 71 and 72 in the region of the tapered edges 83 and 84 to come into contact with the upper edge of the lowermost pot $P_1$, thus applying a force on the pot in a downward direction and causing the pot to separate from the stack. Upon separation, the pot P will freely fall into the opening 57 of the catch plate 52 whereby it can be manually removed by the operator and is thus ready for utilization. The movable slide plate 68 will have then reached its lowermost or extended position and the cycle will now be complete.

To begin a new cycle, the power cylinder 101 will again be energized in an upward direction causing the slideable base plate assembly 68 to move upwardly whereby the stripper fingers will also be moved upwardly and the clamping jaw 39 will be moved outwardly into the open position by means of the resilient central portion 41 causing the follower portion 43 to bear against the inclined camming surface 97. However, before the clamping jaws are returned to their open position, the swing arm 58 will be cammed inwardly by the inclined cam surface 97 so that the block member 64 is positioned beneath the bottom surface of the lowermost pot. Thus, when the clamping jaws are released and returned to their open position, the pots will drop onto the block member 64. Before the pots are allowed to drop, however, the stripper fingers 71 and 72 will be biased inwardly toward each other by the tension spring 79, the inward movement being limited by the fixed stop pins 81. When the stack of pots is released by the clamping mechanism and permitted to drop, the periphery of the lowermost pot will contact the tapered edges 83 and 84 on the stripper fingers, the weight of the pots causing the stripper fingers to pivot outwardly against the tension of the spring 79 whereby the pots fall downwardly until the lowermost pot contacts the upper surface of the adjustment block 64. In this manner, the lowermost pot thus passes downwardly through stripper fingers 71 and 72 until the stripper fingers are positioned at an elevation substantially above the upper edge of the pot $P_2$, which is now the lowermost pot, the spring 71 biasing the stripper fingers inwardly toward each other after the pot $P_2$ passes therethrough so as to position the fingers directly above the edge of the said pot so as to contact the same when the device is actuated to initiate a new cycle of operation.

If desired, limit switches can be utilized to control the stroke extremities of the slideable base plate 68 so as to cause automatic recycling of the power cylinder whereby the apparatus will automatically and continuously separate and dispense the pots after the machine has initially been put into operation.

In some situations, it has been found preferable to replace the fixed clamp finger 38 with a spring clamp finger 39 identical to that as disclosed and shown in FIGURE 1. When this modification is made, the clamping mechanism then comprises a pair of spring clamp fingers 39 located on diametrically opposite sides of the pot guide 26, each of the spring fingers having a clamping jaw 47 mounted on the end thereof for engagement with the periphery of the second lowermost pot $P_2$. When a pair of identical spring clamp fingers 39 is utilized, each leg of the horizontal plate member 69 is provided with a cam block 96 thereon, the cam blocks confronting one another so as to coact with the respective spring fingers 39 which are mounted on opposite sides of the tubular pot guide 26. This modification of the invention has been found to be advantageous since the use of two spring clamps located on opposite sides of the pot guide causes both jaws to simultaneously move into engagement with and clamp the respective pot $P_2$, thus maintaining the stack of pots centrally located within the tubular pot guide at all times. Thus, it is not necessary to apply all of the force through a single spring clamp member so as to cause the stack of pots to shift laterally into engagement with the other clamp jaw as is true when a fixed clamp jaw 38 is utilized. The use of two spring clamp fingers thus permits a greater clamping force to be exerted upon the pots and also eliminates any tendency for misalignment which might occur when utilizing a fixed clamping jaw.

*Modification*

FIGURE 7 illustrates a modification of the invention as described above, wherein the power cylinder 101 has been replaced by a mechanical linkage whereby the apparatus can be manually operated by the machine operator without requiring any power sources for effecting the separating and dispensing operation. Since many of the components used in the modified machine are identical to the components as used in the basic apparatus described above, the reference numerals used in FIGURES 1–6 will also be used to describe similar components of the modification of FIGURE 7 with the suffix A added thereto.

As is shown in FIGURE 7, a manually operated plunger assembly 121 is provided for actuating and reciprocating the slideable base plate assembly 68A which is mounted for vertical sliding movement on the frame 21A. A tubular pot guide (not shown) is connected to the upper portion of the frame 21A by means of the guide bracket 27A in substantially the same manner as illustrated in FIGURE 2. A channel member 122 is connected to the guide bracket 27A intermediate the pot guide and the side plate 22A by means of bolts 123. The legs of the channel member 122 are provided with coaxial openings 126 and 127 therein, a rod or plunger member 128 being mounted therein for vertical reciprocal movement. The upper end of the rod 128 has a threaded opening coaxially located therein for threadably receiving a cap screw 129, a washer 131 being positioned between the upper end of the rod and the head of the cap screw and being fixedly held in position by the threaded connection therebetween. A compression spring 132 is positioned between said washer 131 and the upper leg 133 of the channel 122 for biasing the rod member 128 in an upward direction. If desired, a tubular spring guide 134 can be provided concentrically surrounding the rod 128 within the spring 132 for guiding and controlling the flexing movement thereof.

The lower end of the rod 128 is provided with a similar coaxial threaded counterbore for receiving a cap screw 137 therein. The horizontal leg 69A of the slideable base plate assembly 68A is provided within an opening coaxially aligned with the rod 128 whereby the base plate assembly can be fixedly interconnected to the rod 128 by means of the horizontal leg 69A being fixedly clamped between the lower end of the rod 128 and the head of the cap screw 137, the plate 68A being fixedly held in position due to the threaded connection between the cap screw and the rod.

A hook or loop 138 is provided on the underside of the horizontal leg 69A, being fixedly connected to either the horizontal leg 69A or the head of the cap screw 137. A link or chain 139 has one end thereof interconnected with the hook 138 and the other end thereof interconnected with an operating lever 141. The operating lever 141 is interconnected to a bracket 143 by means of a bolt 142, the bracket 143 in turn being fixedly connected to the frame 21A by means of bolts 144. The end of the lever 141 is provided with a knob or plate-like extension 146 on the end thereof for a purpose to be described hereinafter. The axis of the bolt 142 functions as a pivot for the operating lever whereby the lever 141 can be oscillated in a vertical direction to a limited extent about the axis of the bolt.

The remaining portions of the modified form of the invention as illustrated in FIGURE 7 are identical with the apparatus as described in connection with FIGURES 1–6 and thus further description thereof is not necessary.

The modification illustrated in FIGURE 7 operates in substantially the same manner as the invention illustrated in FIGURES 1–6, the only difference being that the apparatus is manually operated rather than being operated by a power cylinder as is true in the primary form of the invention as described above. As is illustrated in FIGURE 7, the spring 132 maintains the rod 128 and the slideable base plate assembly 68A in its uppermost position, corresponding to the position illustrated in FIGURES 1 and 2. To separate the lowermost pot from a stack of pots contained within the tubular pot guide, the operator of the device will manually push downward on the operating lever 141 causing it to pivot about the bolt 142 (clockwise as shown in FIGURE 7). The downward pivot movement of the lever 141 will impose a tension force on the chain 139 which will in turn cause the slideable base plate assembly 68A and the rod 128 to be linearly moved in a downward direction against the bias of the spring 132. The base plate assembly 68A is fixedly connected to the rod 128 and will be guided in its movement due to the fact that the rod 128 is guided by the openings 126 and 127 contained within the leg members of channel 122. During the downward movement of the slideable base plate assembly 68A, the clamp jaws will grip the second lowermost pot contained within the stack and the swing arm mechanism will move out from beneath the stack of pots so as to permit the stripper fingers to engage the upper edge of the lowermost pot to separate the same from the stack in substantially the same manner as described above.

After the lowermost pot has been separated from the stack, the operator will then permit the spring 133 to return the slideable base plate assembly 68A to its uppermost position substantially as shown in FIGURE 7, whereby the stack of pots contained within the pot guide are permitted to drop down onto the swing arm assembly so as to place same into position whereby the lowermost pot can thus be separated by means of the operator again applying a downward force to the knob 146 so as to pivot the operating lever 141 in a downward direction. Utilizing the above-described apparatus, it is obvious that the operating lever 141 could be actuated either by the hand, knee or foot of the operator, this being merely a matter of design choice as to whichever form of operation is most desirable since the operating lever 141 can be pivotally mounted to the frame 21A at any desired elevation therealong.

It will be recognized by this mechanism a single operator can separate a large number of pots in a relatively short time with a minimum amount of damage to the pot structure. Furthermore, the separation operation can be made either semiautomatic or completely automatic by utilizing a power cylinder substantially in the manner described with relation to FIGURES 1–6, thus requiring a minimum amount of supervision over the machine. On the other hand, the same basic machine can be very simply adapted for complete manual operation by merely removing the power cylinder and replacing the same with a manually actuated plunger assembly as illustrated in FIGURE 7, thus resulting in a machine which will simply and efficiently permit a single operator to separate a large number of pots within a short time.

Further, the machine described is of low cost to build and to maintain. The machine contains only simple linkages which require little expensive machining and are of very simple operation and therefore dependability of operation is insured.

Furthermore, only a single power mechanism is preferably used, and this can be replaced by a manual actuating means if desired, therefore requiring very little maintenance.

The machine described is furthermore well adapted for varying sizes of pots since the stripper jaws and the clamping jaws or fingers can be readily interchanged so as to be adaptable to various pot sizes. These changes can be made with a minimum amount of effort since only the stripper fingers and the clamping fingers have to be replaced, the remainder of the machine being basically the same and operating in exactly the same manner. Furthermore, if desired, the machine could be made completely automatic by locating a conveyor underneath the tubular pot guide so that the pots, when separated and dispensed, will be deposited onto the conveyor and automatically conveyed to a new work location, thus requiring no manual supervision or effort on the part of the machine operator.

While the foregoing described embodiments were designed for handling pots of circular cross section, modification thereof to handle pots of square, rectangular, elliptical or other cross sections will be obvious from the foregoing and the claims hereof will include such modifications unless expressly limited otherwise.

Although a particular preferred embodiment has been described for illustrative purposes, it will be recognized that variations or modifications of such disclosure which lie within the scope of the appended claims are fully contemplated.

The embodiments of the invention in which an exclusive property or privilege is claimed are defined as follows:

1. A pot dispensing apparatus for separating and dispensing individual pots from a stack thereof, said apparatus comprising:

a frame, said frame being adaptable to receiving a stack of pots therein;

dispensing means mounted on said frame for holding the stack of pots and for separating the lowermost pot therefrom, said dispensing means comprising holding means for holding the stack of pots and separating means for moving the lowermost pot from the stack;

said separating means having fingers engageable with the upper edge of the lowermost pot for separating the same from the stack and resilient means for biasing said fingers inwardly toward each other whereby said fingers overlie said upper edge;

and actuating means for controlling the dispensing means so as to permit individual pots to be separated and dispensed from the apparatus.

2. The apparatus of claim 1 wherein said holding means has a pair of jaws which are clampingly engageable on substantially opposite sides of the periphery of at least one pot contained in said stack, at least one of said jaws being movable from an open position out of engagement with said pots to a closed position in clamping engagement with said pot.

3. The apparatus of claim 1 wherein said holding means includes a spring clamp finger and a fixed clamp finger, said fixed clamp finger being fixedly mounted relative to said frame and having a clamping jaw thereon, said spring clamp finger having a first end interconnected to said frame and a second end having a clamping jaw mounted thereon, said spring finger clamping jaw being movable from an open position out of engagement with said pot to a closed position in clamping engagement with said pot;

and resilient means biasing said movable clamping jaw into said open position out of engagement with said pot;

said actuating means including a reciprocable cam member coacting with said spring clamp finger for moving said movable jaw from said open position to said closed position in clamping engagement with said pot, the movement of said clamping jaw to said closed position causing said pot to come into contact with said fixed clamp jaw whereby said pot is fixedly clamped between said fixed clamp jaw and said movable clamp jaw.

4. The apparatus of claim 1 wherein the separating means includes a pair of fingers movably mounted relative to said frame for opposed synchronous movement, said fingers being movable from a first position wherein the fingers are spaced adjacent the periphery of said pots to a second position wherein the fingers substantially overlie the upper edge of the lowermost pot in the stack, said resilient means interconnecting said fingers for biasing same in opposed directions toward each other so as to position said fingers in said second position, said fingers being cammed outwardly to said first position against the bias of said resilient means by the outer periphery of said pots as said stack of pots is moved relative to said frame.

5. The apparatus of claim 1 wherein the separating means includes a pair of levers pivotally mounted relative to said frame for opposed synchronous movement, said levers having said fingers thereon, said levers being movable from a first outer position wherein the fingers are spaced adjacent the periphery of said pot to a second inner position wherein the fingers substantially overlie the upper edge of the lowermost pot in the stack, and said resilient means comprising spring means interconnecting said levers for biasing said fingers in opposed directions toward each other so as to position said fingers in said second position.

6. The apparatus of claim 1 further including stop means movable between a first position in which said stop means holds said stack of pots in said apparatus and a second position for permitting the separated pots to be dispensed from the apparatus, and wherein the separating means includes a pair of levers pivotally mounted relative to said frame for opposed synchronous movement, each of said levers having a finger thereon, said levers being movable from a first position wherein the fingers are spaced adjacent the periphery of said pots to a second position wherein the fingers substantially overlie the upper edge of the lowermost pot in the stack, said resilient means comprising spring means interconnecting said fingers for biasing same in opposed directions toward each other so as to position said fingers in said second position, said fingers being moved to said first position against the bias of said spring means by the outer periphery of said pots as said stack of pots falls downwardly so as to come into contact with said stop means, the weight of said stack of pots overcoming the bias of said spring means so as to move said fingers to said first position, said spring means returning said fingers to said second position when said stack of pots comes to rest upon said stop means.

7. The apparatus of claim 1 wherein said actuating means comprises a reciprocable slide means for controlling the holding and separating operation of the dispensing means, and wherein said separating means includes a pair of fingers engageable with the upper edges of the lowermost pot, the separating means being movably mounted on said reciprocable slide means so as to permit pivotable movement of said fingers in a first plane substantially perpendicular to the longitudinal axis formed by said stack, said reciprocable slide means being mounted for reciprocable movement in a direction substantially parallel to the longitudinal axis formed by said stack.

8. The apparatus of claim 1 wherein said actuating means includes a reciprocable slide means for controlling the holding and separating operations of the dispensing means, and power means operably connected to said reciprocable slide means for controlling the reciprocable movement thereof, said power means including a fluid pressure cylinder.

9. The apparatus of claim 1 wherein the actuating means includes a reciprocable slide member for controlling the holding and separating operations of the dispensing means, a manually actuated operating member interconnected to said slide member for imposing reciprocable movement thereto, and spring means biasing said slide member in a first direction.

10. The apparatus of claim 2 wherein the other jaw of said holding means is fixed relative to said frame.

11. The apparatus of claim 2 wherein said holding means includes a resilient member having an elongated body portion fixedly connected at one end thereof to said frame, the other end of said body portion having a follower portion connected thereto substantially transverse to said body portion, the extending end of said follower portion having a gripping jaw thereon adapted for gripping the outer periphery of the sidewall of a pot, said resilient member biasing said jaw outwardly to said open position out of engagement with said pot.

12. The apparatus of claim 2 further including resilient means biasing said one clamping jaw outwardly to said open position out of engagement with said pot, said actuating means including a reciprocable cam means engageable with said one clamping jaw for moving same into engagement with said pot, and said separating means including a pair of levers pivotally mounted relatively to said frame for opposed synchronous movement, each of said levers having a finger thereon, said levers being movable from a first outer position wherein the fingers are spaced adjacent the periphery of said pots to a second inner position wherein the fingers substantially overlie the upper edge of the lowermost pot in the stack, and spring means interconnecting said levers for biasing said fingers in opposed directions toward each other so as to position said fingers in said second position, said fingers being moved to said first position against the bias of said spring means by the outer periphery of said pots as said stack of pots moves downwardly relative to said frame.

13. The apparatus of claim 2 wherein said stack of pots comprises delicate and disintegrable nursery pots, such as peat pots, having no top rim thereon, said clamping jaws being engageable on substantially opposite peripheral sidewalls of said pot substantially adjacent the upper edge thereof.

14. The apparatus of claim 6 wherein said actuating means includes a reciprocable cam means engageable with said holding means for moving said holding means into engagement with said pot, said cam means also being engageable with said stop means for controlling the movement of said stop means between said first and second positions.

15. The apparatus of claim 9 wherein said manually actuated operating member comprises a lever pivotally mounted to said frame and link means interconnecting said lever to said slide member whereby manual actuation of said lever moves said slide member in a second direction in opposition to said spring means, said movement in said second direction actuating said dispensing means whereby the lowermost pot is separated from the stack.

16. The apparatus of claim 11 wherein said body portion is elongated substantially in the direction of the longitudinal axis of said stack of pots, and said actuating means including a reciprocating cam member slideably engageable with said resilient member for moving said one jaw into clamping engagement with the periphery of said pot.

17. The apparatus of claim 7 wherein said reciprocable slide means includes a U-shaped member having a base portion and a pair of extending legs defining a central opening therebetween, said stack of pots being positioned within and extending through said central opening, said pair of fingers being pivotally mounted on said U-shaped member with each of said fingers extending substantially along the length of one of said legs, said resilient means including spring means interconnected between said pair of fingers for biasing said fingers inwardly into said central opening toward each other, and said actuating means including cam means fixedly interconnected to said U-shaped member for reciprocable movement therewith, said cam means being engageable with said holding means for moving said holding means to a closed position for holding said stack of pots.

18. The apparatus of claim 2 wherein both of said jaws are movable from an open position out of engagement with said pots to a closed position in clamping engagement with the periphery of at least one of said pots, and further including resilient means biasing said jaws outwardly to said open position.

References Cited

UNITED STATES PATENTS 1,173,648 2/1916 Cooley _____ 221—221 X
3,283,955 11/1966 Crabtree _____ 221—221 X STANLEY H. TOLLBERG, *Primary Examiner.*